Dec. 18, 1962    R. B. MULVANY ETAL    3,068,948
SCALE
Filed March 18, 1958    3 Sheets-Sheet 1
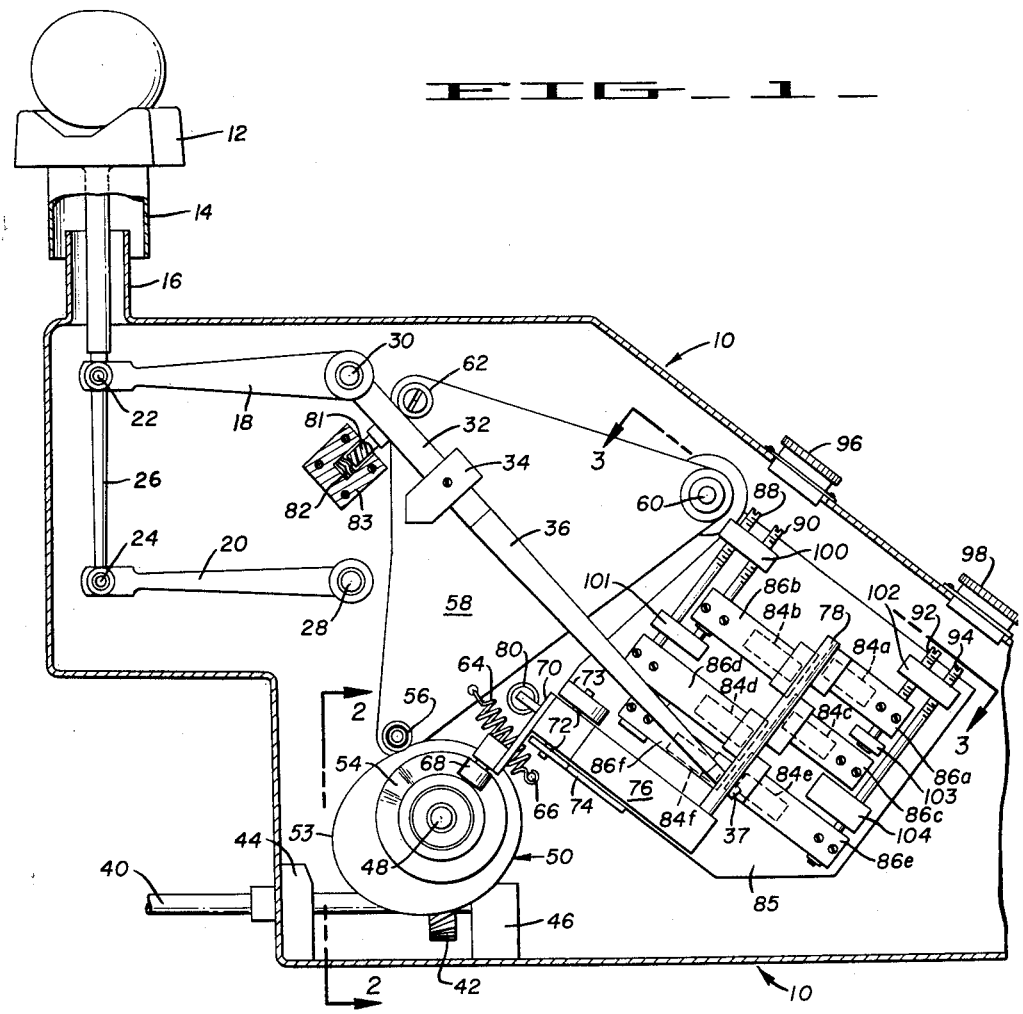
FIG_1_
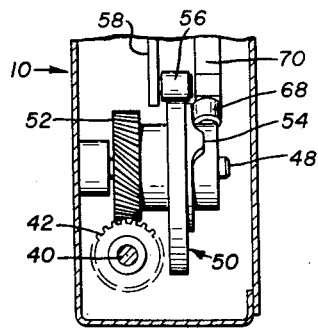
FIG_2_
INVENTORS
RICHARD B. MULVANY
HARRY A. MULVANY DECEASED
BY ROBERT F. MULVANY EXECUTOR
BY    Eckhoff & Slick, Attys.
A Member of the firm Dec. 18, 1962   R. B. MULVANY ETAL   3,068,948
SCALE
Filed March 18, 1958   3 Sheets-Sheet 2
FIG_3_
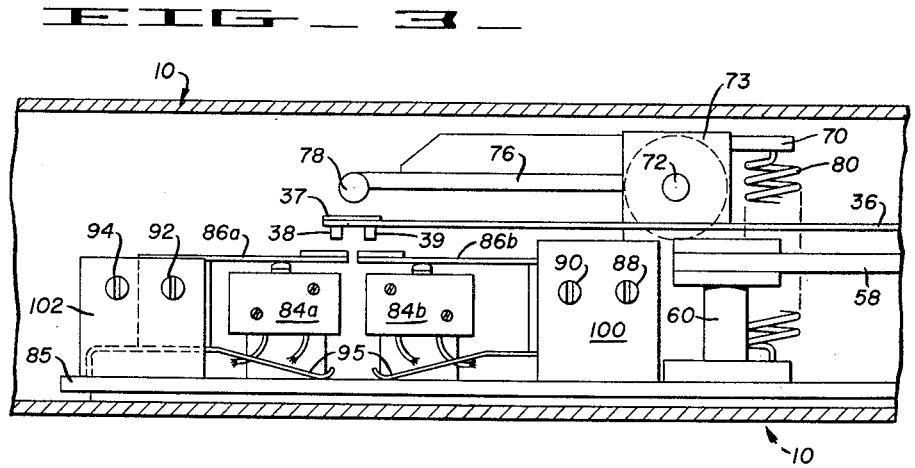
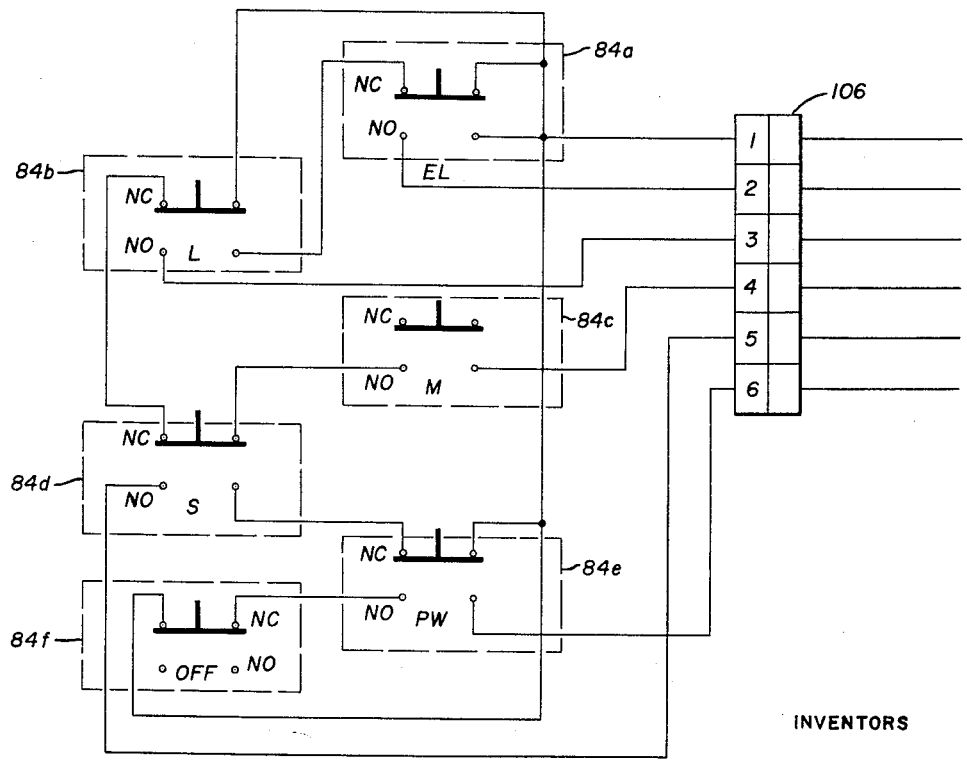
FIG_4_
INVENTORS
RICHARD B. MULVANY
HARRY A. MULVANY DECEASED
BY ROBERT F. MULVANY EXECUTOR
BY   Eckhoff & Slick, Attys.
A member of the firm

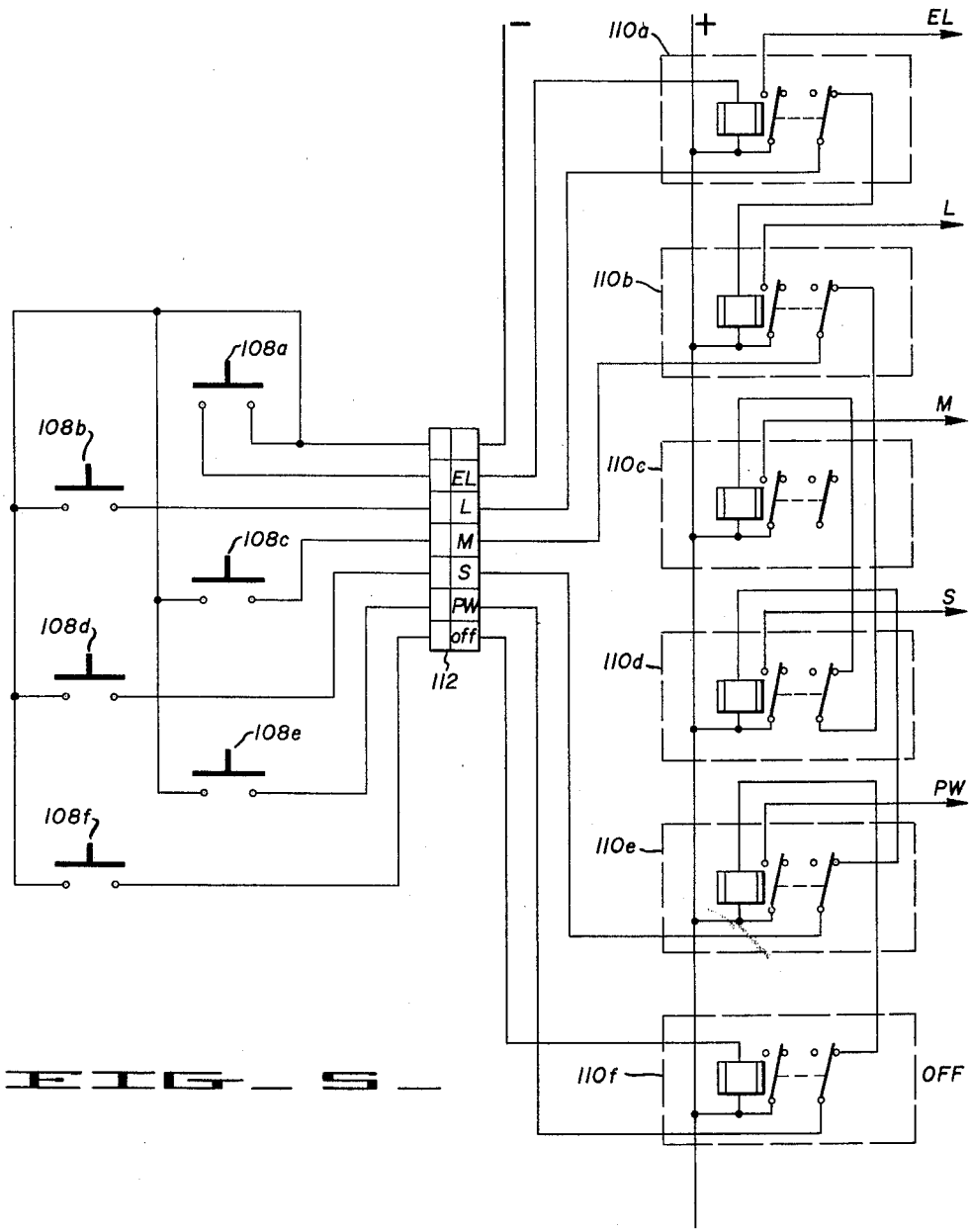

United States Patent Office 3,068,948
Patented Dec. 18, 1962

3,068,948
SCALE
Richard B. Mulvany, 1339 Grizzly Park Blvd., Berkeley, Calif., and Harry A. Mulvany, deceased, late of Berkeley, Calif., by Robert Francis Mulvany, executor, 2820 Claremont Ave., Berkeley, Calif.
Filed Mar. 18, 1958, Ser. No. 722,258
4 Claims. (Cl. 177—224)

This invention relates to a device for determining the relative weight of articles and more particularly to a scale mechanism capable of indicating the relative weight of eggs.

An object of this invention is to provide an improved weight testing machine especially for use in conjunction with automatic machinery wherein articles are fed to a scale and immediately thereafter discharged therefrom in a timed sequence.

It is a further object of this invention to provide a weighing apparatus which while relatively sensitive, operates in a timed cycle of operation which is predetermined and uniform.

Still another object of this invention is to provide means for automatically weighing articles which fall into a variety of weight categories such as eggs.

Still another object of this invention is to provide means for varying the number of articles falling into a given weight category whereby the eventual distribution of the objects in various categories may be controlled by the scale operator.

Ancillary objects and advantages of this invention, if not specifically set forth, will become apparent during the course of the description which follows.

Generally, this invention concerns a weight-balance scale for dividing articles into various weight categories wherein the articles are fed to a scale pan and discharged therefrom in timed sequence. Structures for delivering objects such as eggs to a scale pan and removing them therefrom are common and will not be described here. Such a structure is set forth in, e.g., the Mansbendel Patent 2,197,381. Where eggs are to be weighed on the machine, a vacuum transfer device of the type shown in the Larsen Patent 1,779,174 may be more suitable.

Basically, the structure comprises a balance assembly which has a pan or tray supported at one end thereof and preferably a flexible arm mounted at the other. Means for locking the assembly while an object to be weighed is being placed in the pan is provided, this locking assembly preferably comprising a cam rotated into such a position that the lobe forces the balance assembly into a locked position. As the cam continues to turn, it releases the balance assembly—but so slowly that the assembly tips at a rate less than the natural rate of tipping of the assembly for a minimum unbalancing force. The cam is also provided with a second lobe and an apparatus associated with that lobe. This additional apparatus comprises a depressible bar long enough to extend the full length of the maximum possible path of travel of the tip of the flexible arm aforementioned. When the second lobe is turned so that it strikes its associated follower, the bar is depressed and strikes the tip of the flexible arm. Mounted adjacent the flexible arm's path of travel and beneath the pivoted bar is a series of switches. Preferably, since the machine is specifically designed for the weighing of eggs, there must be means provided for adjusting the position of the individual switches so that the machine is not absolutely preset in advance as to weights of eggs which will fall into various categories. That is, it is desired to provide means for, say, increasing the number of eggs which will fall into the "extra large" category at the expense of the "large," or vice versa.

In the drawings:
FIGURE 1 is a side elevational view, partially in section, of the over-all interior structure of this invention;
FIGURE 2 is a fragmentary view, taken along line 2—2 of FIGURE 1 and showing the cam and associated drive means;
FIGURE 3 is an enlarged fragmentary view of the structure taken along line 3—3 of FIGURE 1 and showing two switches and the associated means for closing one or more switches;
FIGURE 4 is a wiring diagram of the scale electrical circuit; and
FIGURE 5 is a diagram of an alternative wiring arrangement utilizing relays.

Referring to the drawings wherein like characters refer to like parts throughout, metal exterior container 10 serves as a frame upon which additional stationary and moving parts are mounted. This also precludes dust and liquid egg gaining ingress and affecting operation. Mounted on the exterior of this structure is a tray or pan 12, that shown here being of a polyethylene plastic especially suited for use with eggs. The pan is provided with a collar 14 which extends about the upright tube 16 so as to form a dust seal and prevent access of foreign matter to the interior of the structure. The scale balance is of the pantograph type consisting of a cast aluminum balance arm 18 and a similar lower link 20 pivoted at points 22 and 24, respectively, to the moving vertical post 26 of the pantograph assembly. The bottom link of the pantograph is pivoted at point 28 and the upper link is pivoted at point 30. Balance arm 32 is provided with a counterweight 34 which may be provided with means for adjusting it longitudinally of the balance arm so as to vary the lever arm distance. At the extreme end of the balance assembly, a flexible (as shown) or pivoted arm 36 is secured in a slot. This arm is provided at the tip thereof with a contact plate 37 having a pair of contact points 38 and 39 on the under side thereof. As a further alternative, arm 36 may be entirely rigid and the one or more contact points 38 and 39 might be replaced with pins extending through either side of the arm and mounted to slide back and forth in the arm. In short, any structure might be used which could be mounted on or associated with a swinging arm 36 and which could be depressed by a force from above.

Extending exterior of the metal container is the drive shaft 40 which may be joined to a source of rotary power, not shown. This drive shaft has keyed thereon a helical gear 42 and is journaled in bearings 44 and 46 mounted in the case 10. The transverse shaft 48 is mounted on the case 10 at the rearmost side thereof and has a cam 50 journaled about said shaft. Cam 50 also has mounted thereon a suitable helical gear 52 for cooperation with the pinion gear 42. Cam 50 is provided with a pair of lobes, one on the periphery of the cam, this being designated 53, and the second mounted more or less adjacent the drive shaft 48 and extending normal to the plane of the cam, this lobe being designated 54. As an alternative to a single cam bearing two lobes, it is possible obviously to use one cam 53 mounted on shaft 48 for causing the upward movement of follower 56 and a second independent cam either mounted on shaft 48 also or in some other fashion operatively associated with cam 53 for lifting follower 68. Hence, the preferred embodiment of the invention involves a single cam having two lobes but two operatively associated cams might be employed instead.

Riding along the periphery of cam 50 is cam follower 56 which is mounted at one end of triangular plate 58. The plate is pivoted on pin 60 and has at the third corner thereof a nylon roller 62 which may be caused to rest against the balance arm as shown in FIGURE 1. Spring 64 is secured to the plate 58 and to the post 66 secured to case 10. This provides means for maintaining follower 56 adjacent cam 50.

A second cam follower 68 is mounted on arm 70 having pin 72 pivoted to brackets 73 and 74 which are mounted upright on the inside of the case 10. A second arm 76 is mounted on the far side of the pin 72. Bar 78 is mounted perpendicularly to arm 76 and is so positioned that it lies directly over the maximum possible path traversed by contact plate 37 of flexible arm 36. Spring 80, secured to arm 70 at one end and to the base of the case 10 at the other, provides means for holding the follower 68 adjacent the cam surface. Nylon stop pin 81 is mounted on the face of case 10 adjacent the lowermost surface of balance arm 32 so as to prevent further movement of the balance arm thereby preventing aluminum element 18 from striking the undersurface of the case. Stop pin 81 is normally urged upwardly by rubber pad 82 at the base of the well of pin receptacle 83.

The switch assembly is made up of a series of Licon single-pole double-throw switches 84a–84f which are secured in two opposed rows to a base plate 85 on housing 10. Adjustable pivot plates 86a–86f are mounted above the switches along the line of travel of contact plate 37. Four of the plates, 86a, 86b, 86d and 86e, are longitudinally adjustable by rotation of their respective pivot screws 92, 90, 88 and 94, the pivot plates being biased upwardly by spring arms 95 which hold the plates in position between their respective switches 84a and 84b and contact points 38 and 39 by pressing against plate 85. Caps 96 and 98 may be screwed to the top of the case 10 so as to provide access to the adjusting screws. The various adjusting screws are screwed into upright posts 100, 101, 102, 103, and 104. The switch plates 86a, 86b, 86d and 86e are pivotally secured at a point on the appropriate adjusting screw, a circumferential slot in the screw shaft at either end of the appropriate plate and a spring clip in each of these slots serving to position said plates on said adjusting screws.

FIGURE 4 is a wiring diagram of the scale's electrical contacts.

The various switches, each one corresponding to a given egg grade, are shown in schematic form in the drawing and are designated 84a for the switch corresponding to the extra-large size, 84b for the switch used for the large size, 84c for the switch for the medium size, 84d for the switch used for the small size, and 84e for the peewees. A final switch 84f designates the switch used to prevent an external contact closure when there is no egg on the scale tray. Starting with the top contact plate marked EL (extra-large) on its lower edge, one may see the operation of the electrical circuit. The large switch (L) is wired in series through the normally closed contacts (NC) of the extra-large switch. Thus, when just the extra-large switch is operated by a very heavy egg, the extra-large switch will close its external circuits. However, if both the large and the extra-large switches are closed by an egg weight (and, due to the opposed relationship of certain of the switches in the two rows, such simultaneous contact is possible), the operation of the extra-large switch will open the normally closed contacts which feed the switch for the large, and thus the extra-large again will operate its external circuit. If only the large switch operates by a large weight egg, the large external circuit will work. Thus, by raising or lowering the edge of the extra-large contact plate (moving it longitudinally of member 78 as viewed in FIGURE 1 of the drawings), it is possible to change the distribution of eggs into the large or extra-large weight ranges. Similarly, by raising or lowering the lower edge of the large contact plate, it is possible to control the distribution of eggs between large and medium (M) weight ranges. By raising or lowering the upper edge of the small (S) contact plate, one can control the distribution of eggs into the small and medium weight ranges, and by controlling the upper edge of the peewee (PW) contact plate, one can control the distribution of weight between peewee and small. As aforementioned, the lower plate marked "off" prevents an external contact closure (through operation of the peewee switch) when there is no egg on the scale tray. The various switches are wired to a cannon plug 106. The means by which this information is utilized is not a part of this invention. Numerous devices are known for performing this function.

An alternative wiring arrangement utilizing single-throw switches 108a, 108b, 108c, 108d, 108e and 108f, which actuate relays 110a, 110b, 110c, 110d, 110e and 110f, is shown in FIGURE 5. The plates serving to close the switch contacts are adjustable in the fashion of plates 86 described earlier, and each switch corresponds to a given egg size as does the corresponding relay. When the extra-large switch 108a alone is operated by a very large egg, the circuit will be completed through the cannon plug 112 and relay 110a will be actuated, its normally open contacts being closed to complete the external circuit. Where both the extra-large and large switches are closed, only relay 110a is actuated. The opening of the normally closed contacts of relay 110a will interrupt the flow of current from the pin of cannon plug 112, marked L, and hence relay 110b will not operate. However, if only switch 108b is closed, current will flow through pin L of cannon plug 112 and, by means of the normally closed contacts of relay 110a, to relay 110b. This actuates relay 110b and closes its normally open contacts. Thus, the "large" external circuit is closed.

As is apparent from the wiring diagram, the medium relay 110c will be operated only when neither the large (110b) nor small (110d) relays is energized since relay 110c is wired is series through the normally closed contacts of relays 110b and 110d. Further, the peewee circuit alone will operate if both the small (108d) and peewee (108e) switches are closed for the small relay 110d is wired in series through the normally closed contacts of the peewee relay 110e. Finally, the peewee relay 110e is wired is series through the normally closed contacts of the off relay 110f so that if both switches 108e and 108f are closed, only the external circuit of the off switch will be closed.

In operation, the movement of the balance arm components 18 and 32 are controlled by the balance locking plate 58 which is normally pivoted about pin 60 in a counterclockwise fashion and in such a manner that nylon roller 62 forces the arm into a downwardly position against stop pin 81. The plate is caused to rotate counterclockwise because of the effect of spring 64. At the time the egg is loaded onto the egg tray, the control cam 50 is at a position in its rotation so as to cause the balance locking plate to hold the balance arm against the aforementioned nylon stop pin. When sufficient time has passed for the correct loading of the scale tray, the control cam, turned at a controlled rate of speed under the influence of shaft 40, allows the balance locking plate 58 to slowly raise its nylon roller 62, thus allowing the interlocked arm components 32 and 18 to seek an equilibrium position determined by the weight of the egg on the egg tray. As the balance arm nears its equilibrium position, it will cease to follow the nylon roller 62. Shortly after this, contact control cam 54 operates contact rocker arm 70 as a result of the cam lobe 54 striking the roller 68. Bar 78 is depressed followed by flexible arm 36 so that one or both of the contact pins on the underside of tip 37 come into contact with pivot plate(s) 86. This operates one or more of the scale switches. The contact control cam keeps the rocker arm closed long enough for any external electrical circuits associated with the scale to operate, and then the rocker arm and associated bar move away from the flexible arm and the contact is reopened. Shortly after this, the control cam 50 relatively rapidly moves the nylon roller 62 down to bring the scale back to its loading position and lock it for the removal of the egg and the loading of the new egg.

The aforedescribed scale has been operated successfully in repeatedly weighing eggs in preselected weight ranges with an accuracy of better than 2 grams. While the balance arm does not actually reach a static position before the contact plate 37 is pushed into the contact plates 86, this does not materially affect accuracy since the relation between rocker control cam 50 and cam lobe 54 is fixed. Thus, so long as the control assembly is rotated at the same speed, the scale will exhibit a high degree of repeatability in results.

Obviously, many modifications and variations of the invention as hereinbefore set forth may be made without departing from the spirit and scope thereof, and therefore only such limitations should be imposed as are indicated in the appended claims.

We claim:

1. In a weight-balance scale for dividing articles into various weight categories wherein said articles are fed to a scale pan and discharged therefrom in timed sequence, the improvements comprising: a balance assembly supporting said pan at one end thereof and an arm at the other, said arm having one free end; means for locking said assembly while said pan is being filled; means to release said balance assembly slowly whereby to permit said assembly to tip at a rate less than the natural rate of tipping of said assembly when the unbalancing force is at a practical minimum; a series of electrical contact assemblies positioned along the line of travel of said arm and beneath said end of said arm in two partially opposed coplanar rows, said electrical contact assemblies consisting of pivoted plates mounted above electrical switches, each of said switches controlling an external electrical circuit, said pivoted plates being mounted in two parallel rows, said rows both lying in a plane parallel to the plane of the travel of the said arm, certain of said plates being adjustable longitudinally along the arc of travel of the end of said arm whereby to provide for contact of between one and two of said contact plates by said arm simultaneously, the dimensions of said plates and the degree of adjustability thereof permitting the contact of said arm with a maximum of only a single plate in any one row at any one instant, each of said plates contacted by said arm operating an electrical switch therebeneath, said switches being electrically connected so that where two of said plates are contacted by said arm simultaneously to operate two switches, the power supply to one of said operated switches is interrupted by operation of the other of said switches whereby to permit only one switch to control an external electrical circuit at one time.

2. The structure of claim 1 wherein said switches are single-pole double-throw switches.

3. The structure of claim 1 wherein said switches are single-pole single-throw switches and wherein said switches control external relays, said relays interrupting the flow of current to more than one external circuit at any one time.

4. In a weight-balance scale for dividing articles into various weight categories wherein said articles are fed to a scale pan and discharged therefrom in timed sequence, the improvements comprising: a balance assembly supporting said pan at one end thereof and an arm at the other end thereof, said arm having one free end; a constantly rotating cam; means for operatively connecting said cam to said balance assembly whereby to allow a lobe of said cam to lock said balance assembly while said pan is being filled and to release said balance assembly thereafter whereby to permit said balance assembly to tip at a rate less than the natural rate of tipping of said balance assembly when the unbalancing force is at a practical minimum; a second cam operated in a timed relationship with said first rotating cam; means for contacting the lobe of said second cam at a time when said balance assembly has been fully released; means operatively associated with said second cam contacting means and actuated thereby to depress at least a portion of said arm; means actuated by said portion of said arm depressed to determine the position of said arm; said means to determine the position of said arm comprising a series of electrical contact assemblies positioned along the line of travel of said arm and beneath said end of said arm in two partially opposed coplanar rows, said electrical contact assemblies consisting of pivoted plates mounted above electrical switches, said pivoted plates being mounted in two parallel rows, said rows both lying in a plane parallel to the plane of travel of the said arm, each of said switches controlling an electrical circuit, certain of said plates being adjustable longitudinally along the arc of travel of said arm whereby to provide for contact of between one and two of said contact plates by said arm simultaneously, the dimensions of said plates and the degree of adjustability thereof permitting the contact of said arm with a maximum of only a single plate in any one row at any one instant, each of said plates contacted by said arm operating an electrical switch, said switches being electrically connected so that where two of said plates are contacted by said arm simultaneously to operate two switches, the power supply to one of said operated switches is interrupted by operation of the other of said switches whereby to permit only one switch to control an external electrical circuit an any one time.

References Cited in the file of this patent

UNITED STATES PATENTS

| | | |
|---|---|---|
| 2,167,517 | Korber | July 25, 1939 |
| 2,197,381 | Mansbendel | Apr. 16, 1940 |
| 2,819,682 | Falkowski | Jan. 14, 1958 |
| 2,848,588 | Hackman | Aug. 19, 1958 |